United States Patent [19]

Magnusson et al.

[11] Patent Number: 4,480,330
[45] Date of Patent: Oct. 30, 1984

[54] ARRANGEMENT FOR DIGITAL TONE DISTRIBUTION

[75] Inventors: Stig E. Magnusson, Phoenix; Sergio E. Puccini, Scottsdale; Kamal I. Parikh, Phoenix, all of Ariz.

[73] Assignee: GTE Automatic Electric Inc., Northlake, Ill.

[21] Appl. No.: 443,263

[22] Filed: Nov. 22, 1982

[51] Int. Cl.³ .................... H04Q 11/04; H04J 15/00
[52] U.S. Cl. .................................. 370/110.2; 370/63
[58] Field of Search .................. 370/59, 110.2, 63; 179/84 VF

[56] References Cited

U.S. PATENT DOCUMENTS 4,170,718 10/1979 Miyazaki et al. .................. 370/63
4,178,483 12/1979 Lager et al. ........................ 370/63
4,254,498 3/1981 Tawara et al. .................... 370/63
4,360,911 11/1982 Hardy ............................... 370/63
4,380,064 4/1983 Ishikawa et al. ................ 370/110.2

Primary Examiner—Douglas W. Olms
Assistant Examiner—Frank M. Scutch, III
Attorney, Agent, or Firm—Frank J. Bogacz; Robert J. Black

[57] ABSTRACT

An arrangement for the distribution of digital service tones in a distributed processor digital switching network is shown. These service tones are distributed between the time stages of the digital switching network with a minimum of interprocessor communication. This is accomplished by transmitting the particular service tone, from the terminating time stage which detects the need for tone application, through the switching network paths already established for voice communication. These service tones include such tones as reorder tone, dial tone, busy tone, DTMF tones, MF tones and ringback tone.

7 Claims, 1 Drawing Figure

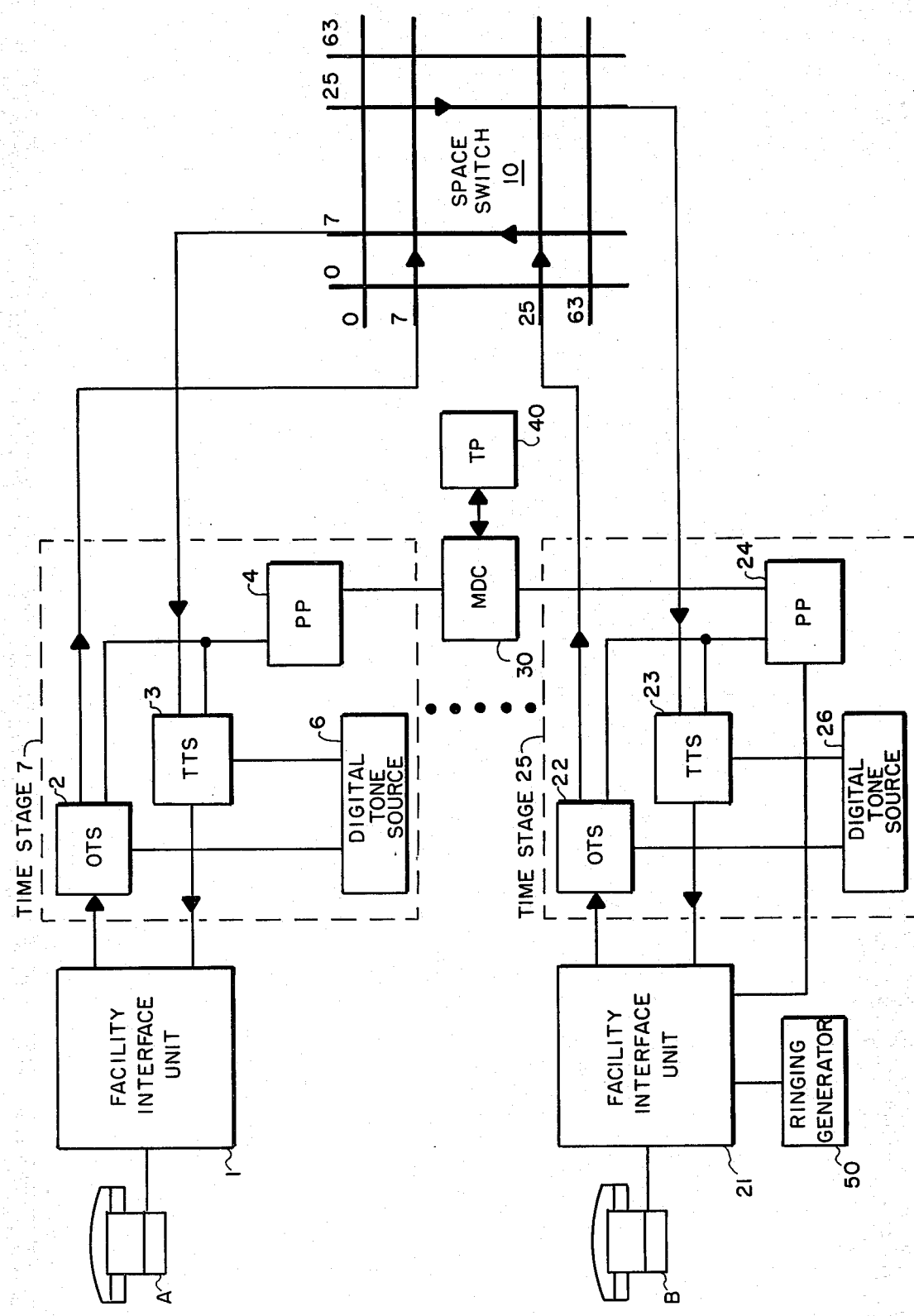

ARRANGEMENT FOR DIGITAL TONE DISTRIBUTION

BACKGROUND OF THE INVENTION

The present invention pertains to digital switching networks with distributed processing control and more particularly to an arrangement for digital service tone distribution in a time switching network.

In distributed processing time switching systems, each time switching stage may be controlled by a separate central processing unit (CPU). In addition, at least one control CPU would be provided to instruct each of the CPUs of each time switching stages.

Previously in time switching networks, digital service tones have been inserted at the terminating time switching stage of the network for connection to its subscriber. Then, the terminating time switching stage would transmit a message to the originating time switching stage to return a similar service tone to the subscriber connected to it. In distributed processing arrangements, a number of interprocessor communications are required to accomplish this. The CPU of the terminating time stage must communicate the need for the application of tone to the control CPU. The control CPU must communicate to the originating time stage and instruct it to apply the particular tone. Then, the CPU of the originating time stage must acknowledge the application of the service tone to the control CPU. Then, the control CPU must return this acknowledgment to the terminating time stage CPU. A similar scenario would be performed for removal of the tone.

During periods of high traffic, this interprocessor communication tends to slow the effectiveness of the switching system. Furthermore, the switching system subscribers would notice a considerable delay in the application or removal of any service tone by the switching system.

Accordingly, it is the object of the present invention to provide an arrangement for digital service tone distribution in a multiprocessor controlled time switching network with minimal interprocessor communications.

SUMMARY OF THE INVENTION

The present invention is an arrangement for digital tone distribution in a digital switching network of a multiprocessor switching system. A number of switching system subscribers are connected to the multiprocessor switching system for data transfer.

The digital switching network includes a number of time switching stages with at least one subscriber connected to each stage. Each of the time switching stages includes an originating time switching stage for switching digital data from the subscriber. The time switching stage also includes a terminating time switching stage for switching digital data to the subscriber. A processor system of each time switching stage is connected to both the originating and terminating time switching stages. This processor system controls the switching operation of the originating and terminating time switching stages.

Each time switching stage also includes a tone generator which is connected to the originating and terminating time switching stages of the particular time switching stage The tone generator operates to produce digital data representing any of a number of digital service tones.

The switching network also includes an intermediate switching stage which is selectively connected to each of the time switching stages. The intermediate switching stage operates to transfer digital data between any two of the time switching stages.

The processor system of each of the time switching stages is connected with a control processor system. The control processor system transmits switching control information to the processor system of any time switching stage. This switching control information provides for selecting a connection of any time switching stage to the intermediate switching stage. The processor system of a time switching stage operates to connect the tone generator of its corresponding time switching stage through the intermediate switching stage to the time switching stage which is connected to another subscriber.

DESCRIPTION OF THE DRAWINGS

The included single sheet of drawings is a block diagram of a multiprocessor controlled digital switching network embodying the principles of operation of the present invention.

DESCRIPTION OF THE PREFERRED EMBODIMENT

Referring to the drawings, the pertinent portion of a multiprocessor controlled digital switching network is shown. The digital switching network may contain many time switching stages in the present example up to 64 time switching stages. Two time switching stages are shown for purposes of explanation; these are time switching stages 7 and 25. As a practical requirement, a switching system would require at least two time switching stages to be equipped. Each time switching stage includes an originating time switching stage (OTS) and a terminating time switching stage (TTS). Time switching stage 7 includes OTS 2 and TTS 3; and, time switching stage 25 includes OTS 22 and TTS 23.

A number of switching system subscribers are connected to each of the equipped time switching stages via a facility interface unit. For example, subscriber A is connected to time switching stage 7 via facility interface unit (FIU) 1 and subscriber B is connected to time switching stage 25 via facility interface unit 21. Subscribers may be ordinary voice telephone traffic, high speed digital data transmission such as T1 spans or analog data transmission such as modems.

For analog subscribers such as ordinary voice calling subscribers or modems, FIUs such as 1 and 21 convert incoming analog signals to PCM signals for transmission to the network. In addition, these FIUs convert outgoing PCM signals to analog for transmission to the subscribers. Each FIU has a capacity of 193 channels. Each channel is 648 nanoseconds in duration and there are 193 channels per PCM time frame of 125 microseconds.

Each time switching stage also includes a digital tone source, for example, time switching stage 7 includes digital tone source 6 and time switching stage 25 includes digital tone source 26. In addition, time switching stage 7 is controlled by peripheral processor (PP) 4 and time switching stage 25 is controlled by PP 24. Peripheral processor 4 is connected to OTS 2 and TTS 3. Peripheral processor 24 is connected to OTS 22 and TTS 23. The peripheral processor of each time switching stage is connected to the message distribution complex (MDC) 30. The MDC 30 transmits control information to each of the peripheral processors to enable the peripheral processors to switch the digital data through the switching network.

A group of telephony processors 40 (TP) is connected to the message distribution complex. Each TP 40 selects paths through the digital switching network and transmits this path control information through the MDC 30 to each of the peripheral processors. As a result, each processor is enabled to select the particular connections through the time switching stage for connecting its respective subscribers. The number of telephony processors which are connected to the MDC 30 depend on the number of equipped time switching stages in the switching network. Each of the peripheral processors and telephony processors may comprise an Intel 8086 central processing unit along with suitable memory and interface units. Intel is a registered trademark of the Intel Corporation.

Space switch 10 is selectively connected to any of the time switching stages. In the present example, time switching stages 7 and 25 have been connected through space switch 10. Space switch 10 is a 64×64 switch, which provides full availability for up to 64 time switching stages.

Digital tone source 6 is connected to OTS 2 and TTS 3. Digital Tone source 26 is connected to OTS 22 and TTS 23. Each of the digital tone sources may produce a number of digital service tones such as: ringback tone, MF tone, DTMF tone, busy tone, dial tone and reorder tone. In the following example, ringback tone will be used for the purposes of explanation.

An example will serve to illustrate the operation of the arrangement for digital tone distribution. Subscriber A is calling subscriber B. Subscriber A is connected through facility interface unit 1 to originating time switching stage 2 of time switching stage 7. Under control of the telephony processor 40, peripheral processor 4 is instructed to establish connection between space switch 10 and OTS 2. A path is established through space switch 10 to the TTS 23 of time switching stage 25. Telephony processor 40 transmits path control information through MDC 30 to peripheral processor 24. As a result, peripheral processor 24 selects a path through TTS 23, facility interface unit 21 to subscriber B.

Next, a path is established through the switching network from subscriber B to subscriber A. Subscriber B is connected through facility interface unit 21 to OTS 22 of time switching stage 25. Telephony processor 40 establishes a path from OTS 22 through space switch 10 to TTS 3 of time switching stage 7. Finally, a path is established under the control of peripheral processor 4 from TTS 3 through facility interface unit 1 to subscriber A.

Then, telephony processor 40 instructs peripheral processor 24 to apply ringing to subscriber B. Peripheral processor 24 operates to connect subscriber B to ringing generator 50 via FIU 21. As a result, subscriber B's telephone is rung. In addition, ringback tone is to be applied to the calling subscriber, subscriber A. Peripheral processor 24 simply connects digital tone source 26 through OTS 22 on the particular path established for conversation from subscriber B to subscriber A. Ringback tone is then transmitted from OTS 22 through space switch 10, through TTS 3, facility interface unit 1 to subscriber A.

When subscriber B answers, the ringing applied to subscriber B's line is tripped and this condition is detected by peripheral processor 24. As a result, peripheral processor 24 removes the connection of the ringing generator 50 to subscriber B and simultaneously disconnects digital tone source 26 from the originating time switching stage 22, thereby removing the ringback tone to subscriber A. This scheme eliminates a large number of interprocessor communications between telephony processor 40, peripheral processors 24 and 4. Application and removal of the ringback tone was controlled solely by peripheral processor 24. The peripheral processor of each time switching stage operates to connect its respective digital tone source as described in the above example.

The arrangement for digital tone distribution was discussed using ringback tone as an example. Other digitally generated service tones, mentioned above, may be distributed employing the herein described arrangement.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a digital switching network of a Multiprocessor Switching System, an arrangement for digital tone distribution comprising:

a plurality of switching system subscribers including at least first and second subscribers, each said subscriber connected to said multiprocessor switching system for transferring data between any two of said subscribers;

a plurality of time switching means including at least a first and second time switching means connected respectively to said first and second subscribers, each said time switching means including:

originating time switching means connected to at least one said subscriber for switching digital data from said subscriber;

terminating time switching means connected to at least one said subscriber for switching digital data to said subscriber;

first processor means connected to said originating and terminating time switching means and said first processor operated to control said digital data switching via said connected originating and terminating time switching means;

tone generation means connected to said originating and terminating time switching means and said tone generation means operated to produce digital data representing at least one service tone;

said arrangement for digital tone distribution further comprising:

intermediate switching means selectively connected to each of said plurality of time switching means and operated to transfer said digital data between any two of said time switching means;

means for controlling connected to each of said first processor means for transmitting control information to each of said first processor means;

said control information for selecting said connections of said time switching means to said intermediate switching means for connecting any two of said subscribers; and said first processor means of said second time switching means operated to connect said tone generation means of said second time switching means to said first subscriber through said intermediate switching means.

2. An arrangement for digital tone distribution as claimed in claim 1, wherein:
said intermediate switching means is connected to said originating and terminating time switching means of said first and second time switching means;
said first processor means of said second time switching means operated to connect said tone generation means of said second time switching means through said originating time switching means of said second time switching means, said intermediate switching means, said terminating time switching means of said first time switching means to said first subscriber.

3. An arrangement for digital tone distribution as claimed in claim 1, wherein said intermediate switching means includes a space switch.

4. An arrangement for digital tone distribution as claimed in claim 3, wherein said digital switching network includes a time-space-time switching network.

5. An arrangement for digital tone distribution as claimed in claim 1, wherein there is further included a plurality of facility interface units connected between a particular one of said plurality of said time switching means and at least one of said subscribers for converting between analog and digital data.

6. An arrangement for digital tone distribution as claimed in claim 5, wherein said facility interface unit is connected to said originating and terminating time switching means of said one particular time switching means.

7. An arrangement for digital tone distribution as claimed in claim 1, said means for controlling including:
data distribution means connected to each of said first processor means for transmitting said control information to any of said first processor means; and
control processor means connected to said data distribution means and operated to transmit said control information to said data distribution means for subsequent retransmission to any of said first processor means.

* * * * *